(12) United States Patent
Wankmueller

(10) Patent No.: US 10,469,292 B1
(45) Date of Patent: Nov. 5, 2019

(54) APPARATUS AND METHOD FOR CHARACTERIZING AMPLIFIERS IN DECISION FEEDBACK EQUALIZERS

(71) Applicant: Keysight Technologies, Inc., Santa Rosa, CA (US)

(72) Inventor: Axel Wankmueller, Ehningen (DE)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 16/024,663

(22) Filed: Jun. 29, 2018

(51) Int. Cl.
*H04B 17/345* (2015.01)
*H04L 25/03* (2006.01)
*H04L 1/20* (2006.01)

(52) U.S. Cl.
CPC ..... *H04L 25/03057* (2013.01); *H04B 17/345* (2015.01); *H04L 1/203* (2013.01); *H04L 2025/03783* (2013.01)

(58) Field of Classification Search
CPC ..... H04L 25/03057; H04L 2025/03057; H04L 1/203; H04L 1/20; H04L 1/0009; H04L 27/2647; H04B 17/345; H04B 17/006; H04B 17/005
See application file for complete search history.

(56) References Cited

U.S. PATENT DOCUMENTS

| 9,209,948 B2 | 12/2015 | Atwood | |
| 9,264,187 B1 | 2/2016 | Sosa | |
| 2007/0280383 A1* | 12/2007 | Hidaka | H04L 25/03038 375/346 |
| 2011/0187400 A1* | 8/2011 | Watanabe | G01R 31/31928 324/756.02 |

FOREIGN PATENT DOCUMENTS

JP   2012151808 A   8/2012

* cited by examiner

*Primary Examiner* — Ted M Wang

(57) ABSTRACT

A test generator that determines an amplification level of an amplifier within a DFE and a method for determining the amplification level are disclosed. The test generator includes a signal generator that generates a test pattern signal characterized by a repeating digital test pattern and an offset voltage and an input signal port adapted to receive a digital DFE output signal from the DFE, the digital DFE output signal depending on the amplification level. The test generator includes an output control port that communicates a digital command word specifying a gain to be used by the amplifier in the DFE and a threshold for determining if a signal in the DFE is a logical one or logical zero. A controller determines the amplification level by measuring a BER between the test pattern and the digital DFE output signal as a function of the threshold and the offset voltage.

12 Claims, 2 Drawing Sheets

APPARATUS AND METHOD FOR CHARACTERIZING AMPLIFIERS IN DECISION FEEDBACK EQUALIZERS

BACKGROUND

Digital communication buses operating at high frequencies distort the signals in a manner that leads to inter-symbol interference and reflections. One method for reducing this interference and reflections involves the use of a decision feedback equalizer (DFE). The DFE generates a feedback signal based on the values of the previously received bits. The feedback signal is combined with the signal for the current bit to compensate for distortions introduced by inter-symbol interference caused by the previous bits or reflections caused by discontinuities in the characteristic impedance of the transmission path. The DFE can be viewed as a finite impulse response filter (FIR) having one tap for each previously received bit that is to be incorporated in the feedback signal. Each weight of the FIR is set by setting the gain of an amplifier whose input is a signal representing the corresponding previous bit.

In general, the DFE is imbedded in a custom integrated circuit (ASIC) that receives a data signal and generates an output data signal that is corrected for the inter-symbol interference and/or reflected signal components. The amplifiers that implement the FIR are "buried" in the ASIC in a manner that makes directly observing the gain of each amplifier by measuring the output of that amplifier difficult. However, the amplifiers in the ASIC must be characterized after the design is actually fabricated to determine the actual gains of the amplifiers as a function of the internal signals that specify the target gain for each amplifier. For example, in some embodiments there is a digital word that sets the gain of a corresponding amplifier by converting the digital value to an analog value that is coupled to the analog gain input of the amplifier. The amplifier gain as a function of the control word value must be measured to qualify the ASIC design and/or test parts on a production line. This testing procedure presents significant challenges for the test engineers who cannot directly observe the gain of each amplifier.

SUMMARY

The present invention includes a test generator that determines an amplification level of an amplifier within a DFE and a method for determining an amplification level for an amplifier within a DFE. The test generator includes a signal generator that generates a test pattern signal characterized by a repeating digital test pattern and an offset voltage and an input signal port adapted to receive a digital DFE output signal from the DFE, the digital DFE output signal depending on the amplification level. The test generator also includes an output control port adapted to communicate a digital command word specifying a gain to be used by the amplifier in the DFE and a threshold for determining if a signal in the DFE is a logical one or logical zero. A controller determines the amplification level by measuring a bit error rate between the test pattern and the digital DFE output signal as a function of the threshold and the offset voltage.

In one aspect of the invention, the controller varies the offset voltage and determines the offset voltage value for which the bit error rate increases significantly.

In another aspect of the invention, the controller varies the threshold and determines the threshold for which the bit error rate increases significantly.

In another aspect of the invention, the digital output signal includes an output signal from the DFE.

In another aspect of the invention, the test pattern includes one bit for each tap amplifier within the DFE.

In another aspect of the invention, the DFE includes N taps and the test pattern includes a one and N−1 zeros.

In another aspect of the invention, the DFE is characterized by a maximum input signal amplitude, the test pattern is characterized by a maximum test pattern amplitude, and wherein the maximum test pattern amplitude is set such that the test signal amplitude is below the maximum input signal amplitude.

The present invention also includes a method for operating a test instrument to measure an amplification level of an amplifier within a DFE. The method includes causing the test instrument to generate a test pattern signal characterized by a repeating digital test pattern and an offset voltage that is added to the repeating digital test pattern to form a test signal that is input to the DFE. The method also causes the test instrument to send a digital command word specifying a gain to be used by the amplifier in the DFE and a threshold for determining if a signal in the DFE is a logical one or logical zero. The method causes the test instrument to determine the amplification level by measuring the error rate between the test pattern and a digital DFE output signal as a function of the threshold and the offset voltage.

In one aspect of the invention, determining the amplification level includes causing the test instrument to vary the offset voltage and determining the offset voltage value for which the bit error rate increases significantly.

In another aspect of the invention, determining the amplification level includes causing the test instrument to vary the threshold and determining the offset voltage value for which the bit error rate increases significantly.

In another aspect of the invention, the test pattern includes one bit for each tap amplifier in a DFE within the DFE.

In another aspect of the invention, the DFE includes N taps and the test pattern includes a one and N−1 zeros.

In another aspect of the invention, the DFE is characterized by a maximum input signal amplitude, the test pattern is characterized by a maximum test pattern amplitude, and the maximum test pattern amplitude is set such that the test signal amplitude is below the maximum input signal amplitude.

DETAILED DESCRIPTION

Figure 1:
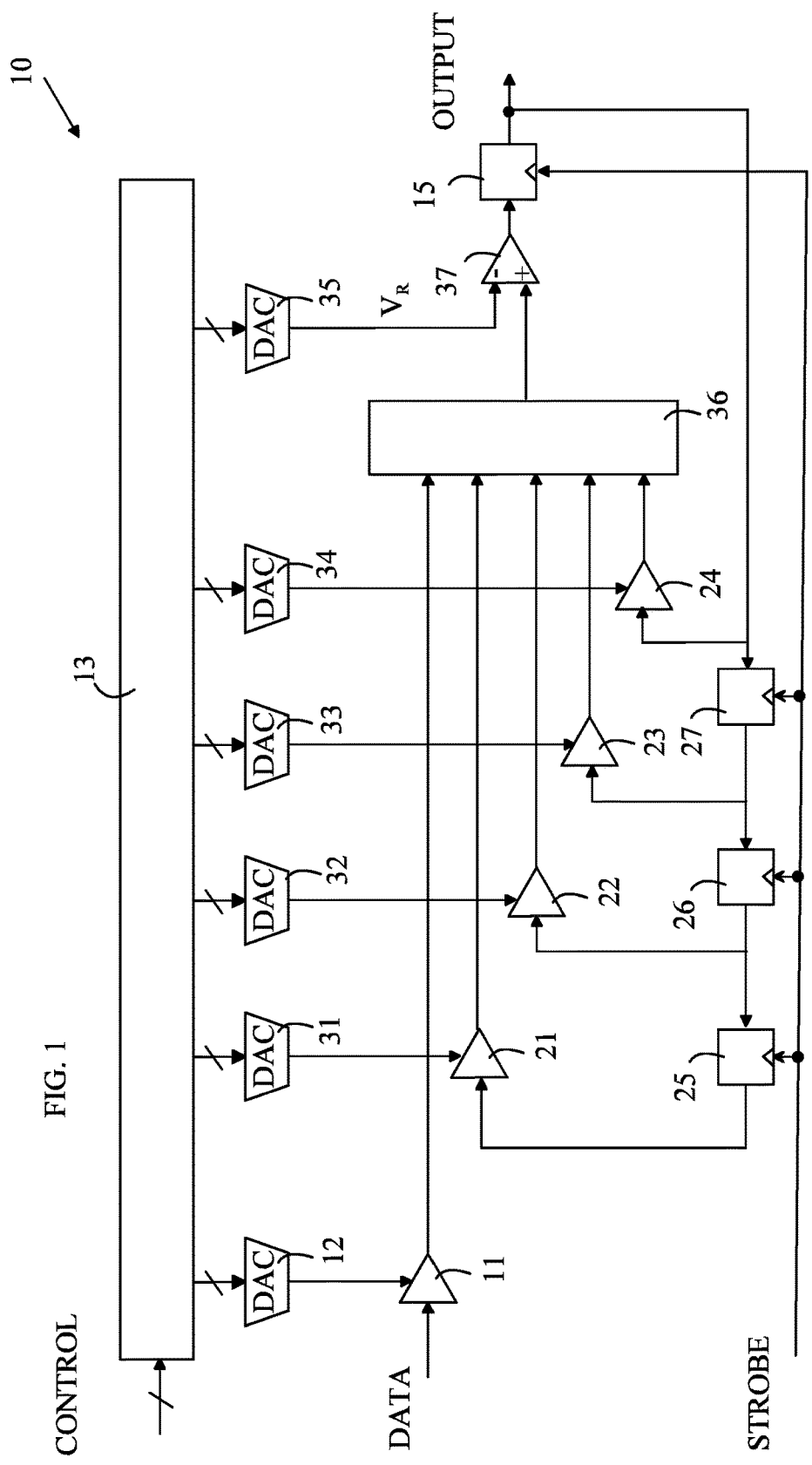
FIG. 1 illustrates a DFE that receives the analog data stream representing a binary stream of symbols and amplifies the data signal with a variable gain amplifier having a gain that is set by a digital-to-analog converter (DAC).

The manner in which the present invention provides its advantages can be more easily understood with reference to a four-tap DFE. Refer now to FIG. 1, which illustrates a DFE 10 that receives the analog data stream representing a binary stream of symbols and amplifies the data signal with a variable gain amplifier 11 having a gain that is set by a DAC 12. The input value for DAC 12 and the other DACs are set by bits in a control register 13 whose values are set by a digital control signal that is input to control register 13. The amplified data signal is input to a combiner 36 which subtracts the outputs of amplifiers 21-24 from the amplified data signal. The output of combiner 36 is input to a comparator 37 whose output is captured by clocked flip-flop 15 to form the output of the DFE.

For the purposes of the present discussion, it is sufficient to note that DFE 10 has four taps whose weights are set by amplifiers 21-24 having gains that are set by DACs 31-34, respectively. The outputs from the amplifiers are subtracted from the output of amplifier 11 in combiner 36. The output of combiner 36 is compared to a reference voltage generated by DAC 35 in comparator 37. The flip-flops shown at 15 and 25-27 are controlled by a strobe signal that synchronizes the output of the receiver to a system clock. The gains for the various amplifiers and the value for $V_R$ are set by corresponding bits in control register 13.

To qualify the design of an ASIC containing DFE 10, the actual parts must be tested to characterize the gain of each amplifier as a function of the gain input to that amplifier. Once the design is qualified, the actual ASIC parts must be tested before being shipped to customers. Such tests can also require that the amplifiers be characterized so that the actual conversion of the digital controls to the amplifier gains can be determined and used in operating the ASIC.

As noted above, such characterizations of the amplifiers are complicated by the fact that the ASIC containing the DFE does not provide access to the internal analog output voltages of the amplifiers or the gain input voltages of the amplifiers. With the exception of the input data value, all of the inputs and outputs of the chip are digital in nature. Hence, simply measuring the input voltage, output voltage, and gain voltage for each amplifier is not practical.

To simplify the following discussion, the gains of amplifiers 11 and 21-24 will be denoted by $g_{11}$ and $g_{21}$-$g_{24}$, respectively. For the purposes of the following example, it will be assumed that the voltage corresponding to a logic level of "1" output by flip-flops 15 and 25-27 will be denoted as $V_L$, and the voltage corresponding to logic level of "0" is 0.

The present invention overcomes this lack of access by utilizing a specific form of input data to DFE 10 together with a control word that sets the gain signal to the amplifier being tested and by observing the resulting bit error rate as a function of the input data pattern and the value of $V_R$. It should be noted that any non-linearity in the DAC that controls the amplifier will be reflected as a non-linearity in the amplifier; hence, the quantities being observed are the combination of the two non-linearities.

Figure 2:
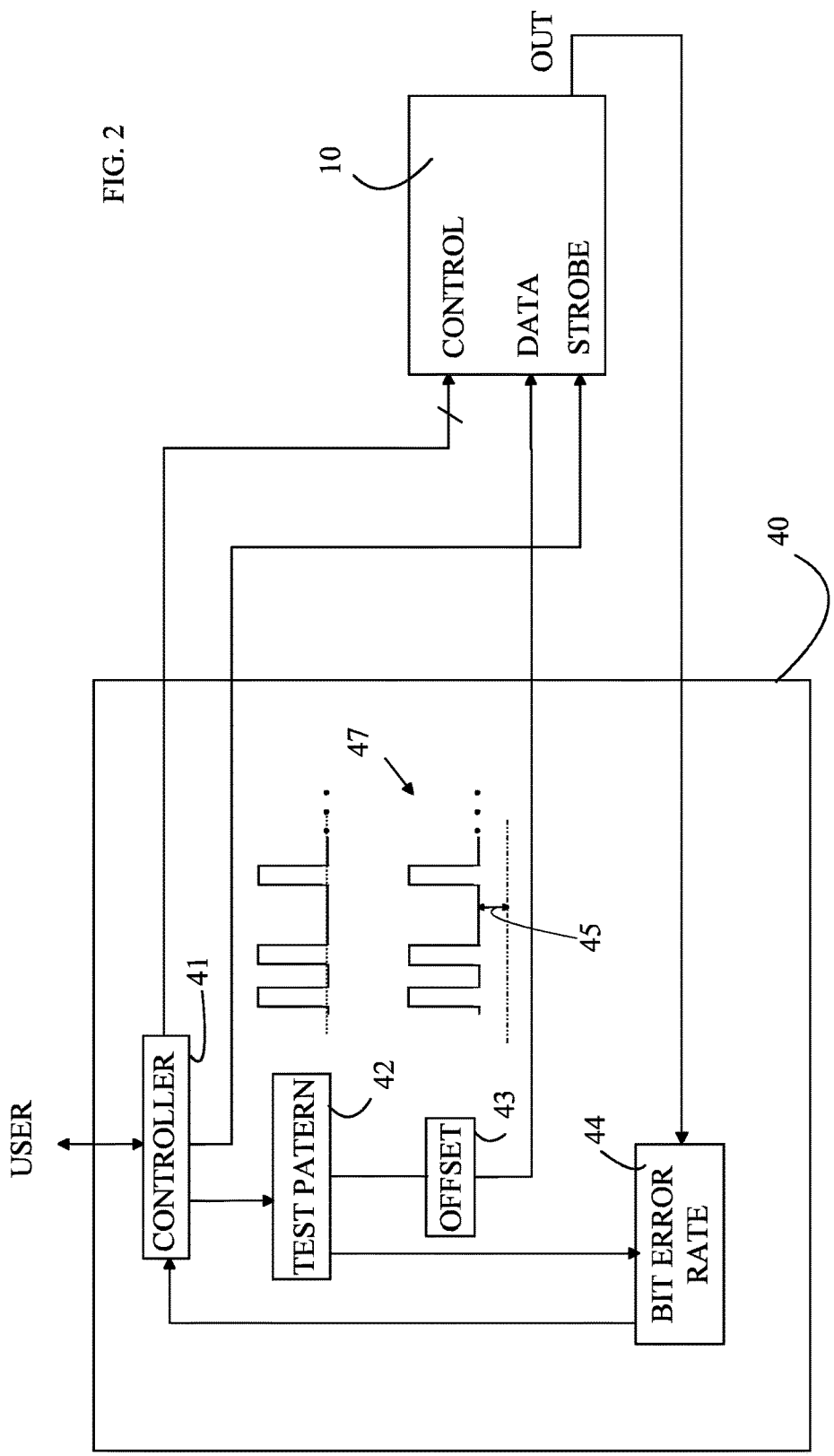
FIG. 2 illustrates a testing system according to one embodiment of the present invention connected to a DFE that is to be characterized.

Refer now to FIG. 2, which illustrates a testing system 40 according to one embodiment of the present invention connected to a DFE 10 that is to be characterized. Testing system 40 generates a test pattern 47 that is offset from ground by an amount shown at 45 and referred to as the offset of the test pattern. To simplify the following discussion, assume that a "1" is represented by a voltage of V in the test pattern, and that a "0" is represented by 0 in the test pattern generated by test pattern generator 42. The output of test pattern 43 is offset by adding an offset voltage 45 to that test pattern. The offset voltage will be denoted by $V_O$ in the following. In this example, it will be assumed that $V_R$ is set to correspond to a voltage of V/2 in the output of the DATA input to DFE 10.

This offset test pattern is input to the DATA input of DFE 10. Controller 41 also generates a digital control word that sets the amplification levels of all of the amplifiers in DFE 10 and reads the output of DFE 10. A bit error rate detector 44 compares the output of DFE 10 to the test pattern generated by test pattern generator 42 and computes a bit error rate that is determined by the number of non-matching outputs from DFE 10.

The present invention is based on the observation that the bit error rate of DFE 10 depends on the specific test pattern, the offset in the test pattern, the amplification levels of each of the tap weight amplifiers in the DFE, and the value of $V_R$. Hence, by measuring the bit error rate as a function of the offset level and/or the value of $V_R$, the amplification levels of each of the amplifiers can be determined without the need to measure the output of each amplifier directly. In general, the bit error rate (BER) as a function of the offset or $V_R$ will exhibit one or more "steps" that depend on the amplification level of one or more of the amplifiers in DFE 10 and the specific test pattern. By observing the location of the steps for one or more test patterns, the amplification levels of each of the amplifiers can be determined.

The manner in which the present invention characterizes individual amplifiers can be more easily understood with reference to a procedure for calibrating amplifier 11 shown in FIG. 1. The goal of the testing protocol is to ascertain the gain of amplifier 11 as a function of the digital value used to control amplifier 11 at the frequencies for which the receiver is designed.

For the purposes of this example, assume that $V_R$ is set such that the test pattern with an offset of zero has a BER of zero and the gains of amplifiers 21-24 have been set to zero. When the offset is 0, the output of amplifier 11 is +$Vg_{11}$ for a "1" and 0 for a "0". Assume $V_R$ is set to $Vg_{11}/2$, and that all of the filter amplifiers have gains set to 0. Then the output of the comparator of flip-flop 15 will be 0 for a 0 in the input data and $V_L$ for a "1" in the input data, and the BER will be zero. As the offset increases, the voltage corresponding to a "0" in the input data stream will reach the point at which the output of the combiner is greater than V/2, and the output comparator 37 will be positive for a "0" in the input stream. At this point, an error occurs for each 0 in the bit pattern. Accordingly, the BER will increase rapidly as the offset voltage is increased from below this point to a value greater than this threshold. Hence, the gain of amplifier 11 is $V_R/V_O$ where $V_O$ is the offset at which the BER increases.

Having calibrated amplifier 11, the gains of the remaining amplifiers can be obtained in an analogous manner. The remaining amplifiers operate on the output signal which is either a logical "1" or "0" with no offset. However, the output of amplifier 11 includes the offset voltage. Hence, the output of combiner 36 will still depend on the offset voltage.

Consider a test pattern of "1000" with an initial state of flip-flop 15 and 25-27 of "0". When the "1" becomes the input to amplifier 24, a "0" will be the current symbol in the input data. The remaining tap amplifiers will have 0 for an input. The output of combiner 36 will be $g_{11}V_O$-$g_{24}V_L$. As $V_O$ increases, there will be a point at which the output of combiner 36 is greater than $V_R$, and a "0" in the input stream will be interpreted as a "1". As this threshold is passed, the BER increases significantly with the offset voltage. Hence, by finding the offset voltage at which the BER increases significantly, $g_{24}$ can be determined.

The same logic can be applied to determine the gain of amplifier 23 from the BER and offset voltage when the next "0" is input to the amplifier 11, and so on. Hence, the actual gains of the filter amplifiers can be deduced from the BER as a function of the test system offset and compared to the expected value set by the control word in control register 13.

In the above-described embodiments, the logic levels within the DFE were 0 and a positive voltage, and hence, a tap amplifier that had an input of "0" was essentially eliminated as an input to the combiner. If the logic levels are −V and +V, the tap amplifiers that are not being characterized can be eliminated by using a control word that sets the gains of those amplifiers to 0.

In the above examples, the test system varies the offset of the test pattern while holding the value of the reference voltage, $V_R$, constant. However, embodiments in which the offset is maintained at a constant value and the value of $V_R$ is varied to determine the point at which the BER increases dramatically can also be reconstructed. In the more general case, a knowledge of the $V_R$ value and offset value at which the BER increases dramatically together with a knowledge of internal signal levels in the DFE is sufficient to compute the gain of one of the filter amplifiers for any given gain input to that amplifier.

In the above-described embodiments, the test signal consists of a test pattern which has an amplitude that varies between two values corresponding to a logical one and a logical zero and an offset voltage which is varied to determine the amplification level by observing the BER as a function of the offset voltage. Accordingly, the amplitude of the test signal during the test will be greater than the amplitude of the test pattern maximum voltage. In general, the DFE is designed to receive a test signal that has a maximum amplitude. Hence, the amplitude range of the test signal must be less than the allowable range of input voltages that the DFE is designed to operate upon. As the offset is varied, it is possible that the amplitude of the test signal will exceed this maximum operating range.

If the amplitude of the test signal exceeds the maximum operating range, the amplitude of the test signal must be reduced. This can be accomplished by reducing the overall amplitude of the test signal or reducing the swing of the test pattern in one direction. For example, if the goal of the offset voltage is to cause the BER to increase because a logical zero is mistaken for a logical one, the amplitude of the signal corresponding to a logical one can be reduced thereby reducing the maximum voltage swing of the test signal that the DFE must operate upon.

The amplitude of the test pattern can also be reduced to maintain the test signal within the design bounds of the DFE. The test pattern amplitude is defined to be the difference in voltage between a logical one and a logical zero in the test signal when the offset voltage is zero. The test pattern amplitude must be sufficient to allow the DFE to provide a low BER when the offset voltage is small. Hence, there is a minimum test pattern amplitude and corresponding $V_{ref}$ that can be utilized. However, as long as the test pattern amplitude is above this minimum, the present invention can be used to characterize the amplifiers in the DFE.

In the above-described embodiments, a particular test pattern consisting of a logical one and a sequence of logical zeros was utilized with the number of bits in the test pattern being equal to the number of taps. However, embodiments having a different number of bits and a different sequence of ones and zeros can be utilized as the repeating test sequence. In some cases utilizing more complex test patterns, the BER as a function of the offset voltage will exhibit a plurality of steep steps corresponding to amplifier gains at which different amplifiers are introducing errors resulting from the bit processed by those amplifiers being mistaken for a one instead of a zero or vice versa.

In the above-described examples, the BER increases from zero to some value that depends on the test pattern when the offset or reference voltage crosses a value that reflects the amplification level of the amplifier being characterized. However, it will be appreciated that the DFE or test signal may be subject to noise, and hence, in practice the BER increases from some value determined by the noise in the system to a value that is significantly greater than the noise. The increase will be characterized by a slope that, in general, is not infinite. The BER as a function of the voltage level being varied can be viewed as a step function that has been corrupted by noise and filtered through a low-pass filter. Hence, the controller must determine the position of the underlying step function. Methods for determining the step location are known to the art, and hence, will not be discussed here.

It should also be noted that the tap weights in the DFE may be negative. That is, the output of the amplifier may be subtracted from the input signal.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A test generator that determines an amplification level of an amplifier within a DFE, said test generator comprising:
   a signal generator that generates a test pattern signal characterized by a repeating digital test pattern and an offset voltage;
   an input signal port adapted to receive a digital DFE output signal from said DFE, said digital DFE output signal depending on said amplification level;
   an output control port adapted to communicate a digital command word specifying a gain to be used by said amplifier in said DFE and a threshold for determining if a signal in said DFE is a logical one or logical zero; and
   a controller that determines said amplification level by measuring a BER between said repeating digital test pattern and said digital DFE output signal as a function of said threshold and/or said offset voltage.

2. The test generator of claim 1 wherein said controller varies said offset voltage and determines said offset voltage for which said BER increases beyond a value determined by noise.

3. The test generator of claim 1 wherein said controller varies said threshold and determines said threshold for which said BER increases beyond a value determined by noise.

4. The test generator of claim 1 wherein said repeating digital test pattern comprises one bit for each tap amplifier within said DFE.

5. The test generator of claim 1 wherein said DFE comprises N taps and said repeating digital test pattern comprises a one and N−1 zeros.

6. The test generator of claim 1 wherein said DFE is characterized by a maximum input signal amplitude, said repeating digital test pattern is characterized by a maximum repeating digital test pattern amplitude, and wherein said maximum repeating digital test pattern amplitude is set such that said test signal amplitude is below said maximum input signal amplitude.

7. A method for operating a test instrument to measure an amplification level of an amplifier within a DFE; said method comprising:

causing said test instrument to generate a test pattern signal characterized by a repeating digital test pattern and an offset voltage;

causing said test instrument to send a digital command word specifying a gain to be used by said amplifier in said DFE and a threshold for determining if a signal in said DFE is a logical one or logical zero;

receiving a digital DFE output signal from said DFE, said digital DFE output signal depending on said amplification level; and causing said test instrument to determine said amplification level by measuring a BER between said repeating digital test pattern and said digital DFE output signal as a function of said threshold and/or said offset voltage.

8. The method of claim 7 determining said amplification level comprises causing said test instrument to vary said offset voltage and determining said offset voltage for which said BER increases beyond a value determined by noise.

9. The method of claim 7 determining said amplification level comprises causing said test instrument to vary said threshold and determining said offset voltage for which said BER increases beyond a value determined by noise.

10. The method of claim 7 wherein said repeating digital test pattern comprises one bit for each tap amplifier in a DFE within said DFE.

11. The method of claim 10 wherein said DFE comprises N taps and said repeating digital test pattern comprises a one and N−1 zeros.

12. The method of claim 7 wherein said DFE is characterized by a maximum input signal amplitude, said repeating digital test pattern is characterized by a maximum repeating digital test pattern amplitude, and wherein said maximum repeating digital test pattern amplitude is set such that said test signal amplitude is below said maximum input signal amplitude.

* * * * *